United States Patent [19]

Pan et al.

[11] 4,439,507
[45] Mar. 27, 1984

[54] LAYERED PHOTORESPONSIVE IMAGING DEVICE WITH PHOTOGENERATING PIGMENTS DISPERSED IN A POLYHYDROXY ETHER COMPOSITION

[75] Inventors: Frank Y. Pan, Rochester; Ian D. Morrison; Leon A. Teuscher, both of Webster, all of N.Y.

[73] Assignee: Xerox Corporation, Stamford, Conn.

[21] Appl. No.: 420,961

[22] Filed: Sep. 21, 1982

[51] Int. Cl.$^3$ .................. G03G 5/00; G03G 5/04
[52] U.S. Cl. .................. 430/59; 430/66; 430/96
[58] Field of Search .................. 430/58, 66, 96, 59

[56] References Cited

U.S. PATENT DOCUMENTS

| | | | |
|---|---|---|---|
| 3,121,006 | 2/1964 | Middleton et al. | 96/1 |
| 3,819,369 | 6/1974 | Trubisky | 96/1.5 |
| 3,977,870 | 8/1976 | Rochlitz | 96/1.5 |
| 4,047,949 | 9/1977 | Horgan | 96/1.5 R |
| 4,081,274 | 3/1978 | Horgan | 96/1 PC |
| 4,115,116 | 9/1978 | Stolka et al. | 96/1.5 R |
| 4,265,990 | 5/1981 | Stolka et al. | 430/59 |
| 4,315,981 | 2/1982 | Wiedemann | 430/59 |
| 4,337,299 | 1/1982 | Van der Bergh | 427/403 |

*Primary Examiner*—John E. Kittle
*Assistant Examiner*—John L. Goodrow
*Attorney, Agent, or Firm*—E. O. Palazzo

[57] ABSTRACT

This invention is directed to an improved photoresponsive device comprised in the order stated of (1) an optional supporting substrate, (2) a conductive layer, (3) a photogenerating layer comprised of an inorganic photoconductive composition, or an organic photoconductive composition, dispersed in a resinous binder material comprised of a poly(hydroxyether) material selected from the group consisting of those of the following formulas:

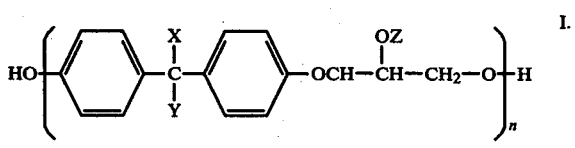

and

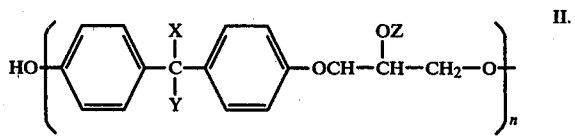

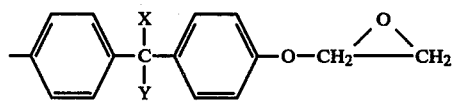

wherein X and Y are independently selected from the group consisting of aliphatic groups and aromatic groups, Z is hydrogen, an aliphatic group or an aromatic group, and n is a number of from about 50 to about 200, and (4) in contact with the photogenerating layer a charge transport layer comprised of an electrically active composition dispersed in an insulating organic resinous binder, which composition is of the following formula:

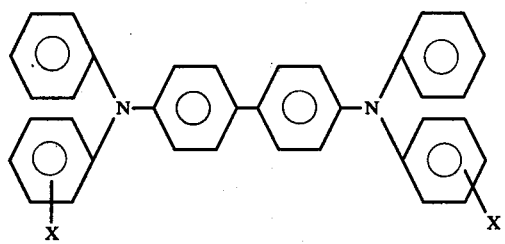

wherein X is selected from the group consisting of ortho ($CH_3$), meta ($CH_3$), para ($CH_3$), ortho (Cl), meta (Cl) and para (Cl); as well as the use of such devices in electrostatographic imaging systems, particularly xerographic imaging systems.

20 Claims, 4 Drawing Figures

LAYERED PHOTORESPONSIVE IMAGING DEVICE WITH PHOTOGENERATING PIGMENTS DISPERSED IN A POLYHYDROXY ETHER COMPOSITION

BACKGROUND OF THE INVENTION

This invention is generally directed to photoresponsive imaging devices, and more specifically, the present invention is directed to improved layered photoresponsive, or photosensitive, imaging devices containing a substrate, a photogenerating layer, and a charge transport layer, wherein the photogenerating layer contains photogenerating pigments dispersed in a resinous binder composition comprised of a poly(hydroxyether). In one embodiment of the present invention, the photogenerating layer and the charge carrier transport layer can be dispersed in a resinous binder material comprised of poly(hydroxyethers), particularly those derived from diphenols. The photoresponsive devices of the present invention are useful as imaging members in electrostatographic imaging systems, particularly, xerographic imaging systems, wherein latent images are formed thereon, and made visible, for example, by developer compositions containing toner particles and carrier particles.

Electrostatographic imaging systems, which are well known, involve the formation and development of electrostatic latent images on the surface of photoconductive materials referred to in the art as photoreceptors, or photosensitive compositions. In these imaging systems, and in particular in xerography, the xerographic plate containing the photoconductive insulating layer is imaged by uniformly electrostatically charging its surface, followed by exposure to a pattern of activating electromagnetic radiation such as light, thereby selectively dissipating the charge in the illuminated areas of the photoconductive member causing a latent electrostatic image to be formed in the non-illuminated areas. This latent electrostatic image can then be developed with developer compositions containing toner particles and carrier particles, followed by subsequently transferring this image to a suitable substrate such as paper. Many known photoconductive members can be selected for incorporation into the electrostatographic imaging system including for example, photoconductive insulating materials deposited on conductive substrates, as well as those containing a thin barrier layer film of aluminum oxide situated between the substrate and the photoconductive composition. The barrier layer is primarily for the purpose of preventing charge injection from the substrate into the photoconductive layer subsequent to charging, as injection could adversely affect the electrical properties of the photoreceptor compositions involved.

Examples of photoconductive members include those comprised of inorganic materials and organic materials, layered devices comprised of inorganic or organic compositions, composite layered devices containing photoconductive substances dispersed in other materials, and the like. An example of one type of composite photoconductive layer used in xerography is described for example, in U.S. Pat. No. 3,121,006, wherein there is disclosed finely divided particles of a photoconductive inorganic compound dispersed in an electrically insulating organic resin binder. In a commercial form, the photoconductive composition involved is comprised of a paper backing containing a coating thereon of a binder layer comprised of particles of zinc oxide uniformly dispersed therein. Useful binder materials disclosed include those which are incapable of transporting for any significant distance injected charge carriers generated by the photoconductive particles. Accordingly, as a result the photoconductive particles must be in substantially contiguous particle to particle contact throughout the layer for the purpose of permitting charge dissipation required for a cyclic operation. Thus, about 50 percent by volume of photoconductive particles, is usually necessary in order to obtain sufficient photoconductor particle to particle contact for rapid discharge. These high photoconductive concentrations can destroy the physical continuity of the resin particles, thus significantly reducing the mechanical strength of the binder layer.

Illustrative examples of specific binder materials disclosed in the No. '006 patent include, for example, polystyrene resins, silicone resins, acrylic and methacrylic ester polymers, polymerized ester derivatives of acrylic and alpha-acrylic acids, chlorinated rubber, vinyl polymers and copolymers, and cellulose esters.

Other known photoconductive compositions include amorphous selenium, halogen doped amorphous selenium substances, amorphous selenium alloys, including selenium arsenic, selenium tellurium, selenium arsenic antimony, halogen doped selenium alloys, wherein the halogen is a material such as chlorine, iodine, or fluorine, cadmium sulfide and the like. Generally, these photoconductive materials are deposited on suitable conductive substrates, and incorporated into xerographic imaging systems for use as imaging members.

Recently, there has been disclosed layered photoresponsive devices comprised of photogenerating layers and transport layers, deposited on conductive substrates as described, for example, in U.S. Pat. No. 4,265,990, and overcoated photoresponsive materials containing a hole injecting layer, a hole transport layer, a photogenerating layer, and a top coating of an insulating organic resin, as described, for example in U.S. Pat. No. 4,251,612. Examples of photogenerating layers disclosed in these patents include trigonal selenium and various phthalocyanines, while examples of hole transport layers include certain diamines dispersed in inactive polycarbonate resin materials. The disclosures of each of these patents, namely, U.S. Pat. Nos. 4,265,990 and 4,251,612 are totally incorporated herein by reference.

Additionally, there is disclosed in Belgium Pat. No. 763,540, an electrophotographic member having at least two electrically operative layers, the first layer comprising a photoconductive layer which is capable of photogenerating charge carriers, and injecting photogenerated holes into a continuous second active layer containing a transporting organic material. The organic material is substantially non-absorbing in the spectral region of intended use, however, it is active in that allows the injection of photogenerating holes from the photoconductive layer and allows these holes to be transported through the active layer.

Other representative patents disclosing layered photresponsive devices include U.S. Pat. Nos. 3,041,116, 4,115,116, 4,047,949 and 4,081,274.

While the above-described photoresponsive devices are suitable for their intended purposes, there continues to be a need for improved devices. Additionally, there is a need for improved photoresponsive devices wherein the photogenerating material and the charge transport material can be dispersed in substantially identical specific resinous binder materials. Further, there continues to be a need for improved photoresponsive devices wherein the inert resinous binder material selected, particularly for the photogenerating composition, can function as an adhesive material, thereby eliminating the need for a separate adhesive layer, the primary purpose of which is to bind the photogenerating layer to a conductive ground plane. Additionally, there continues to be a need for resinous binder compositions which can be laminated and/or solvent coated, which binder is flexible and not brittle. Also, there continues to be a need for inactive resinous binder compositions useful as the dispersing medium for the photogenerating material, and/or the charge transport material, which compositions are substantially inert and thus, do not create environmental hazzards as is the situation with regard to some prior art binder compositions.

SUMMARY OF THE INVENTION

It is an object of the present invention to provide an improved photoresponsive device which overcomes the above-noted disadvantages.

It is yet another object of the present invention to provide an improved photoresponsive imaging device comprised of a conductive layer, a photogenerating layer, and a charge transport layer.

It is yet another object of the present invention to provide an improved photoresponsive imaging device wherein the photogenerating layer is comprised of a photogenerating composition or pigment dispersed in certain resinous binder materials.

In another object of the present invention, there is provided a photoresponsive imaging device wherein the charge transport material is dispersed in certain resinous binder materials.

In yet a further object of the present invention, there is provided an improved photoresponsive imaging device wherein the photogenerating pigment and the charge carrier transport material in contact therewith are dispersed in resinous binder material comprised of poly(hydroxyethers).

In a further object of the present invention, there is provided photoresponsive devices containing relatively inactive resinous binder compositions comprised of poly(hydroxyethers) derived from diphenols.

In yet another object of the present invention there is provided improved photoresponsive imaging devices comprised of photogenerating pigments dispersed in a poly(hydroxyether) resinous binder, and a charge carrier transport layer in contact with the photogenerating layer, containing a transporting material dispersed in an poly(hydroxyether) resinous binder, which devices are useful as imaging members in electrostatographic imaging systems, particularly xerographic imaging devices.

These and other objects of the present invention are accomplished by providing an improved photoresponsive device comprised of an optional supporting substrate, a conductive layer, a photogenerating layer, and a charge carrier transport layer, wherein the photogenerating layer is comprised of photogenerating pigments dispersed in certain selected resinous binder materials. More specifically, the present invention in one embodiment is directed to an improved layered photoresponsive imaging device comprised in the order stated of (1) a substrate, (2) a conductive layer, (3) a photogenerating layer comprised of a material selected from the group consisting of inorganic photoconductive compositions, and organic photoconductive compositions, dispersed in a poly(hydroxyether) resinous binder, and (4) a charge carrier transport layer.

Also included within the scope of the present invention are methods of imaging wherein the described improved photoresponsive imaging device is subjected to an imaging process for the purpose of forming an electrostatic latent image thereon, followed by developing this image with a developer composition comprised of toner particles and carrier particles, subsequently transferring the developed image to a suitable substrate, an optionally permanently affixing the image thereto, by heat.

BRIEF DESCRIPTION OF THE DRAWINGS

For a better understanding of the present invention and further features thereof, reference is made to the following detailed description of various preferred embodiments wherein.

DESCRIPTION OF THE PREFERRED EMBODIMENTS

Figure 1:
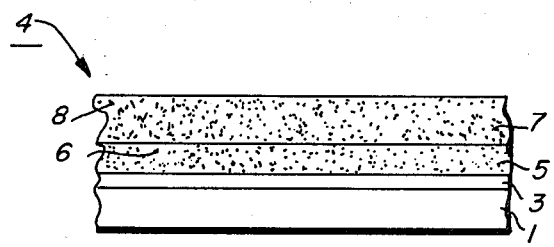
FIG. 1 is a partially schematic cross-sectional view of the photoresponsive imaging device of the present invention.

Illustrated in FIG. 1 is a layered photoresponsive imaging device of the present invention, designated 4, comprising an optional substrate 1, preferably an insulating substrate, a conductive composition 3, a charge carrier photogenerating layer 5, containing a photogenerating composition, comprised of an inorganic photoconductive substance, or an organic photoconductive substance, dispersed in a poly(hydroxyether) resinous binder 6, and a layer of a charge carrier transport material 7, containing a charge transporting substance dispersed in an inert resinous binder 8, which binder can be comprised of a poly(hydroxyether).

Substrate 1 may be opaque or substantially transparent, and may comprise numerous suitable supporting materials having the required mechanical properties. Accordingly, this substrate may comprise a layer of insulating material, such as an inorganic or an organic polymeric composition, or a conductive material, such as aluminum, nickel, or chromium. The conductive material can in one embodiment of the present invention be deposited on a flexible substrate. Illustrative insulating materials include various materials known for this purpose, including resins such as polyesters, polycarbonates, polyamides, polyurethanes, terephthalic resins, commerically available, for example, as Mylar ®, and the like.

The supporting substrate may be flexible or rigid and may be of any number of many different configurations such as, for example, a plate, a cylindrical drum, scrolls, an endless flexible belt, and the like. Preferably, the substrate is in the form of an endless flexible belt, and is comprised of a material commercially available as Mylar ®.

The thickness of the supporting substrate layer depends on numerous factors, including economical considerations, and thus this layer may be of substantial thickness, for example, over 200 microns, or of minimum thickness, less than 50 microns, provided there are no adverse affects on the device. In one embodiment, the thickness of this layer ranges from about 65 microns to about 150 microns, and preferably is of a thickness of from about 75 microns to about 125 microns.

The conductive layer or ground plane 3 in contact with the substrate 1 can be comprised of numerous conductive materials suitable for this purpose including, for example, aluminum, nickel, brass, gold, titanium, stainless steel, chromium, graphite and the like, with aluminum being preferred. The conductive layer 3 can vary in thickness over substantially wide ranges providing the objectives of the present invention are achieved. Accordingly, generally this layer can range in thickness of from about 25 Angstrom units to about 5 inches, however, preferably it is from about 50 Angstrom units to about 750 Angstrom units, and more preferably from about 80 Angstrom units to about 200 Angstrom units, especially when flexibility in the device is desired.

The photogenerating layer 5 in contact with the conductive layer 3 is comprised of inorganic or organic photoconductive materials dispersed in an inactive resinous binder 6, comprised of a poly(hydroxyether) material. Illustrative examples of inorganic photoconductive materials include those well known in the art such as amorphous selenium, selenium alloys, including selenium tellurium, selenium-tellurium-arsenic, selenium arsenic; cadmium sulfoselenide, cadmium selenide, cadmium sulfide, and other forms of selenium and selenium alloys, including the crystalline form of selenium known commonly as trigonal selenium. Also, there can be selected as the photogenerating substance, doped selenium substances, and doped selenium alloys, wherein the dopant contains various known materials including halogens, and alkali metals. Examples of specific dopants that may be used are chlorine, bromine, iodine and sodium, which dopants are present in an amount ranging from about 50 parts per million, to about 5,000 parts per million and preferably from about 100 to 300 parts per million. In addition to trigonal selenium, one preferred inorganic photoconductive material useful in the photogenerating layer 5 is a halogen doped selenium arsenic alloy, wherein the percentage by weight of selenium ranges from about 95 to about 99.5 percent, the percentage by weight of arsenic ranges from about 5 percent to about 0.5 percent, and the halogen chlorine is present in an amount of from about 100 parts per million to about 1,000 parts per million.

Illustrative examples of organic materials selected as the photogenerating pigment include various known materials such as metal free phthalocyanines, metal phthalocyanines, vanadyl phthalocyanines, intermolecular charge transfer complexes including poly(N-vinylcarbazole) and trinitrofluorenone, and the like, as well as the additional photogenerating pigments described in U.S. Pat. Nos. 4,265,990 and 4,251,612, the disclosure of each of these patents being totally incorporated herein by reference. Other specific examples of photogenerating pigments include the X-form of metal free phthalocyanine, reference U.S. Pat. No. 3,357,989 the disclosure of which is totally incorporated herein by reference, metal phthalocyanines, such as copper phthalocyanine; quinacridones commerically available from duPont Chemical Corporation under the tradenames Monastral Red, Monastral Violet and Monastral Red Y; substituted 2,4-diamino-triazines, reference U.S. Pat. No. 3,442,781; and polynuclear aromatic quinones available from Allied Chemical Corporation under the tradename Indofast Double Scarlet, Indofast Violet Lake B, Indofast Brilliant Scarlet and Indofast Orange. Also useful as the photogenerating pigment are various squarilium dyes.

The preferred organic photoconductive composition for the photogenerating layer is vanadyl phthalocyanine.

The photogenerating composition or pigment is dispersed in an inactive resinous binder material comprised of a poly(hydroxyether), including the corresponding epoxide compositions. In one embodiment of the present invention, the poly(hydroxyether) materials, which materials can also function as an adhesive for binding the photogenerating layers to the conductive layers, are selected from the group consisting of those resinsous compositions of the following formula:

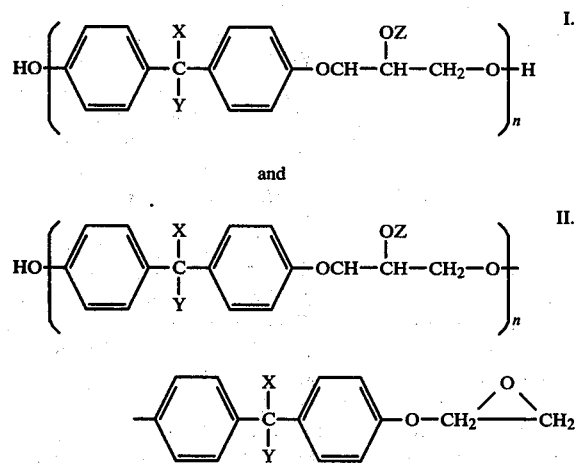

wherein X and Y are independently selected from the group consisting of aliphatic groups and aromatic groups, Z is hydrogen, an aliphatic group, an aromatic group, a carbonyl group, a carboxyl group, a carbonate group and the like, and n is a number of from about 50 to about 200, and preferably from about 75 to about 125. These poly(hydroxyethers), some of which are commercially available from Union Carbide Corporation, are generally described in the literature as phenoxy resins, or epoxy resins.

Examples of aliphatic groups for the poly(hydroxyethers), include those containing from about 1 carbon atom to about 30 carbon atoms, such as methyl, ethyl, propyl, butyl, pentyl, hexyl, heptyl, decyl, pentadecyl, eicodecyl, and the like. Preferred aliphatic groups include alkyl groups containing from about 1 carbon atom to about 6 carbon atoms, such as methyl, ethyl, propyl, and butyl. Illustrative examples of aromatic groups include those containing from about 6 carbon atoms to about 25 carbon atoms, such as phenyl, napthyl, anthryl and the like, with phenyl being preferred. Encompassed within the present invention are aliphatic and aromatic groups which can be substituted with various known substituents, including, for example, alkyl, halogen, nitro, sulfo, and the like.

Examples of the Z substituent include hydrogen, as well as aliphatic, aromatic, substituted aliphatic, and substituted aromatic groups as defined herein. Furthermore, Z can be selected from carboxyl, carbonyl, carbonate, and other similar groups, resulting in for example, the corresponding esters, and carbonates of the poly(hydroxyethers).

Preferred poly(hydroxyethers) include those wherein X and Y are alkyl groups, such as methyl, Z is hydrogen or a carbonate group, and n is a number ranging from about 75 to about 100. Specific preferred poly(hydroxyethers) include Bakelite, phenoxy resin PKHH, commercially available from Union Carbide Corporation and resulting from the reaction of 2,2-bis(4-hydroxyphenylpropane), or bisphenol A, with epichlorohydrin, an epoxy resin, Araldite ® 6097, commercially available from CIBA, the phenylcarbonate of the poly(hydroxyether), wherein Z is a carbonate grouping, which material is commercially available from Allied Chemical Corporation, as well as poly(hydroxyethers) derived from dichloro bis phenol A, tetrachloro bis phenol A, tetrabromo bis phenol A, bis phenol F, bis phenol ACP, bis phenol L, bis phinol V, bis phenol S, and the like and epichlorohydrins.

The photogenerating layer containing photoconductive compositions and/or pigments, and the resinous binder material generally ranges in thickness of from about 0.1 micron to about 5.0 microns, and preferably has a thickness of from about 0.3 micron to about 1 micron. Thicknesses outside these ranges can be selected providing the objectives of the present invention are achieved.

The photogenerating composition or pigment is present in the poly(hydroxyether) resinous binder composition 6 in various amounts, generally, however, from about 10 percent by volume to about 60 percent by volume of the photogenerating pigment is dispersed in about 40 percent by volume to about 90 percent by volume of the poly(hydroxyether) binder, and preferably from about 20 percent to about 30 percent by volume of the photogenerating pigment is dispersed in from about 70 percent by volume to about 80 percent by volume of the poly(hydroxyether) binder composition. In one very preferred embodiment of the present invention, 25 percent by volume of the photogenerating pigment is dispersed in 75 percent by volume of the poly(hydroxyether) binder composition.

In one alternative embodiment, the photoresponsive device of the present invention can contain in the poly(hydroxyether) binder composition from about 10 volume percent to about 20 volume percent of the active diamine transport layer described herein, as a replacement for the resinous binder material.

The charge carrier transport layer 7, can be comprised of numerous suitable materials which are capable of transporting holes, this layer having a thickness of from about 5 microns to about 50 microns, and preferably from about 20 microns to about 40 microns. The charge carrier transport material is dispersed in an inactive resinous binder 8. In a preferred embodiment, the transport layer comprises molecules of the formula:

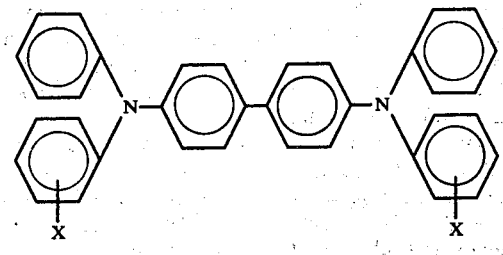

dispersed in an organic resinous material 8, wherein X is selected from the group consisting of (ortho) $CH_3$, (meta) $CH_3$, (para) $CH_3$, (ortho) CL, (meta) CL, (para) CL. This charge transport layer, which is described in detail in U.S. Pat. Nos. 4,265,990 and 4,251,612, is substantially non-absorbing in the spectral region of intended use i.e., visible light.

Illustrative examples of N,N,N',N'-tetraphenyl [1,1-biphenyl]4,4'-diamines corresponding to the above formula include, N,N'-diphenyl-N,N'-bis(alkylphenyl)-[1,1-biphenyl]-4,4'-diamine wherein alkyl is selected from the group consisting of methyl, such as 2-methyl, 3-methyl and 4-methyl, ethyl, propyl, butyl, hexyl and the like. With chloro substitution, the diamine can be named N,N'-diphenyl-N,N'-bis(halo phenyl)- [1,1'-biphenyl-4,4'-diamine wherein halo is 2-chloro, 3-chloro or 4-chloro.

Other electrically active small molecules which can be dispersed in the resinous binder 8 to form a layer which will transport holes include triphenylmethane, bis(4-diethylamine-2-methylphenyl) phenylmethane; 4',4''-bis(diethylamino)-2'2''-dimethyltriphenyl methane, and the like.

Numerous inactive resinous materials 8 can be selected for the charge transport layer 7 including those described in U.S. Pat. No. 3,121,006, the disclosure of which is totally incorporated herein by reference. Further, the binder material 8 can be comprised of the poly(hydroxyether) binders as described herein with reference to the photogenerating layer 5. Accordingly, the binder composition 8 for the charge transport layer 7 can be selected so as to be identical to the resinous binder material 6 for the photogenerating layer 5. In addition to the poly(hydroxyether) compositions, typical useful organic resinous binders materials include polycarbonates, acrylate polymers, vinyl polymers, cellulose polymers, polyesters, polysiloxanes, polyamides, polyurethanes and epoxies as well as block, random or alternating copolymers thereof. Preferred binder materials 8 include polycarbonate resins having a molecular weight ($M_w$) of from about 20,000 to about 100,000 with a molecular weight in the range of from about 50,000 to about 100,000 being particularly preferred; and the poly(hydroxyethers) and epoxides commercially available as Bakelite phenoxy resin PKHH, Araldite ®, epoxy resin 6097, and a phenyl carbonate of a poly(hydroxyether).

The charge transport compositions are dispersed in the resinous binder 8 in various amounts generally, however, from about 10 percent by weight to about 75 percent by weight of the charge transport composition, and preferably from about 40 percent by weight to about 50 percent by weight of the charge transport composition is dispersed in from about 25 percent to about 90 percent by weight of the binder material, and preferably from about 50 percent by weight to about 60 percent by weight of the binder material.

The thickness of the charge transport layer depends on the number of factors including the thicknesses of the other layers and the type of electrical activity desired for the photoresponsive device. Generally, the thickness of this layer, as indicated herein is from about 5 microns to about 50 microns, however, thicknesses outside these ranges can be selected for the charge transport layer, providing the objectives of the present invention are achieved.

Figure 2:
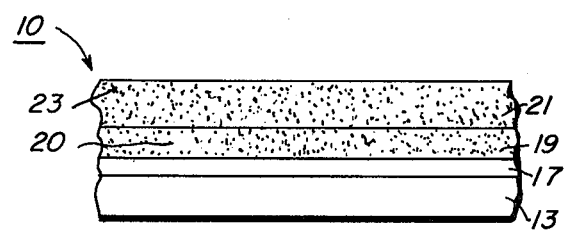
FIG. 2 is a partially schematic cross-sectional view illustrating a preferred photoresponsive imaging device of the present invention.

Illustrated in FIG. 2 is a preferred photoresponsive imaging device of the present invention designated 10 and comprised of an insulating Mylar ®substrate 13, in a thickness of about 75 microns, a conductive aluminum substrate 17 in contact therewith, in a thickness of about 100 Angstrom units, a photogenerating layer 19 comprised of trigonal selenium, 25 percent by volume, dispersed in the poly(hydroxyether) resinous binder, Bakelite phenoxy resin PKHH, commercially available from Union Carbide, 75 percent by volume, this layer being of a thickness of about 0.5 microns, and a charge transport layer 21 containing N,N'-diphenyl-N,N'-bis(3-methylphenyl)-[1,1'-biphenyl]-4,4'-diamine, 50 percent by weight, dispersed in 50 percent by weight of a polycarbonate composition 23, commercially available as Makralon ®, this layer having a thickness of about 25 microns.

Figure 3:
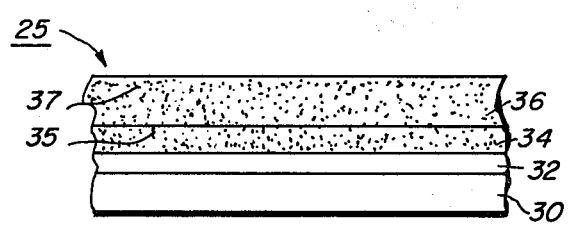
FIGS. 3 and 4 are partially schematic cross-sectional views illustrating photoresponsive imaging devices of the present invention.

Illustrated in FIG. 3 is a preferred embodiment of the photoresponsive imaging device of the present invention designated 25 and comprised of a Mylar ® insulating substrate 30, about 75 microns in thickness, an aluminum layer 32 in a thickness of about 100 Angstrom units, a photogenerating layer 34, comprised of vanadyl phthalocyanine, in an amount of 25 percent by volume, dispersed in 75 percent by volume of a poly(hydroxyether) Bakelite phenoxy resin PKHH 35, commercially available from Union Carbide Corporation, this layer being of a thickness of about 0.5 microns, and a transport layer 36 comprised of about 50 percent by weight of the diamine N,N'-diphenyl-N,N'-bis(3-methylphenyl)- [1,1'-biphenyl]4,4'-diamine, dispersed in 50 percent by weight of the poly(hydroxyether) Bakelite phenoxy resin PKHH, 37, commercially available from Union Carbide Corporation, this layer having a thickness of about 25 microns.

Figure 4:
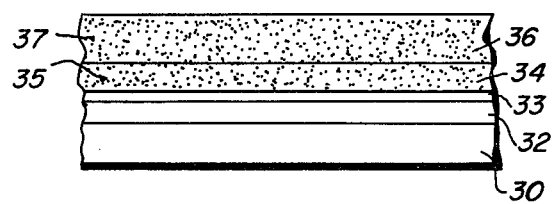

In a further alternative embodiment of the present invention as illustrated in FIG. 4, for example, there can be incorporated as an optional layer, a dielectric layer 33, situated between the photogenerating layer 34 and the aluminum layer 32. Examples of dielectric layers that may be selected for layer 33 include for example, aluminum oxides, preferably $AL_2O_3$, silicon oxides, silicon nitrides, titnates, and the like. Generally, this layer ranges in thickness of from about 0.01 microns, 100 Angstrom units, to about 1 micron, 1,000 Angstrom units, although thicknesses outside these ranges can be employed providing the objectives of the present invention are achieved.

The photoresponsive imaging devices of the present invention can be incorporated into numerous electrostatographic imaging systems, particularly those systems wherein xerographic latent images are formed on such devices. The images formed can then be made visible by contact with a developer composition comprised of toner particles and carrier particles. Subsequently, the developed image can be transferred to a suitable substrate such as paper, and optionally permanently affixing thereto, utilizing, for example, heat.

When the imaging device of the present invention is to be reused to make additional reproductions in a recyclible xerographic apparatus, any residual charge remaining on the photoreceptor after the visible image has been transferred to a receiver member, is removed therefrom prior to each repetition of the cycle, as is any residual toner material remaining after the transfer step. Generally, the residual charge can be removed from the device by ionizing the air above the electrically insulating overcoating of the photoreceptor, while the photoconductive carrier generating layer is uniformly illuminated and grounded. For example, charge removal can be effected by AC corona discharge in the presence of illumination from a light source.

The photoresponsive imaging devices of the present invention can be prepared by various known methods, as described for example in U.S. Pat. No. 4,265,990, the disclosure of which has been totally incorporated herein by reference. In one illustrative preparation sequence, for example, the photogenerating pigment, such as trigonal selenium, and the resinous binder material such as the poly(hydroxyether), are mixed in a solvent of methylethyl ketone and cellosolve acetate for the purpose of obtaining small particle sizes of trigonal selenium, ranging from about 0.1 to about 5 microns. Mixing is accomplished until the desired particle size trigonal selenium is obtained, approximately 1 to 3 days, and subsequently, the resulting trigonal selenium dispersion is coated with a Bird applicator on a conductive layer, which coating is dried at about 130° C. for about 5 minutes. The transport layer can then be coated by known means, such as solution coating on the photogenerating layer, followed by drying at 135° for about 5 minutes. When an additional dielectric layer is incorporated into the photoresponsive device of the present invention, this layer can be vapor deposited on the conducting layer in accordance with known methods.

The invention will now be described in detail with respect to specific preferred embodiments thereof, it being understood that these Examples are intended to be illustrative only and the invention is not intended to be limited to the materials, conditions, process parameters, etc., recited herein. All parts and percentages are by weight unless otherwise indicated.

EXAMPLE I

There was prepared a photoresponsive device by adding to a 4 ounce amber glass bottle, 17.0 milliliters of methylethyl ketone, 7.7 milliliters of methylcellosolve acetate, 3.3 grams of powdered trigonal selenium, 1.6 grams of the poly(hydroxyether) Bakelite phenoxy PKHH, commercially available from Union Carbide Corporation, and 200 grams of ⅛ inch diameter, 316 stainless steel shot. The resulting mixture was then rolled on a roller mill for 96 hours resulting in a dispersion of trigonal selenium, particle size 0.05 microns to 0.20 microns 33 volume percent trigonal selenium in 67 volume percent of phenoxy PKHH. About 1.5 grams of this dispersion was then added to 2.5 grams of solution of tetrahydrofuran, containing 0.025 grams of the diamine N,N'-diphenyl-N,N'-bis(3-methylphenyl)1,1'-biphenyl-4,4'-diamine.

This mixture was then coated on a 20 percent transmissive, 100 Angstrom thickness, aluminum conductive layer, subsequent to vapor deposition of aluminum on a supporting polyester substrate, 75 microns in thickness, the coating being accomplished with a 0.0005 inch Bird applicator. The device was then allowed to dry at 135° C. for 5 minutes, resulting in the formation of a photogenerating layer, 0.6 microns in thickness, containing about 28 volume percent of trigonal selenium dispersed in 72 volume percent of the poly(hydroxyether) PKHH.

Subsequently, there was overcoated on the above photogenerating layer by solvent dispersion a charge transporting layer, 25 microns in thickness, containing 50 percent by weight of N,N'-diphenyl-N,N'-bis(3-methylphenyl)1,1'-diamine, dispersed in 50 percent by weight of a polycarbonate available as Makralon, from Bayer Corporation.

There thus resulted a photoresponsive device containing a polyester supporting substrate, a conductive layer of aluminum in contact with the substrate, a photogenerating layer containing trigonal selenium dispersed in the phenoxy resin PKHH, which photogenerating layer is in contact with the aluminum conductive layer, and an overcoating, in contact with the photogenerating layer of a charge transporting layer, containing the diamine indicated, dispersed in a polycarbonate.

EXAMPLE II

A photoresponsive device was prepared by repeating procedure of Example I with the exception that prior to deposition of the photogenerating layer on the aluminum conductive layer, there was coated on the conductive layer, a dielectric layer of silicon dioxide, in a thickness of 150 Angstrom units, by vacuum deposition of silicon in a low pressure of oxygen gas by known methods. There thus results a photoresponsive device containing in the order stated: (1) a polyester supporting substrate, (2) an aluminum conductive layer, (3) a silicon dioxide dielectric layer, (4) a photogenerating layer of trigonal selenium dispersed in the phenoxy resin PKHH, and (5) a charge transporting layer of the diamine of Example I, dispersed in a polycarbonate.

EXAMPLE III

A photoresponsive device was prepared by repeating procedure of Example I with the exception that nickel, in a thickness of 100 Angstroms, was coated on the polyester supporting substrate, rather than aluminum. There thus results a photoresponsive device containing the following layers in the order indicated: (1) a polyester supporting substrate, (2) a nickel conductive layer, (3) a photogenerating layer of trigonal selenium dispersed in a poly(hydroxyether) resin, and (4) a charge transporting layer of the diamine of Example I, dispersed in a polycarbonate.

EXAMPLE IV

A photoresponsive device was prepared by repeating procedure of Example III with the exception that prior to coating the photogenerating layer on the nickel conductive layer, there was coated on the conductive layer, a dielectric layer of silicon dioxide, in a thickness of 150 Angstroms, by vacuum deposition of silicon in a low pressure of oxygen gas.

There thus results a photoresponsive device containing the following layers in the order indicated: (1) a polyester supporting substrate, (2) a nickel conductive layer, (3) a silicon dioxide dielectric layer, (4) a photogenerating layer containing trigonal selenium dispersed in the poly(hydroxyether) resinous binder, and (5) a charge transport layer containing the diamine of Example I dispersed in a polycarbonate.

EXAMPLE V

A photoresponsive device was prepared by repeating procedure of Example I with the exception that instead of aluminum, there was coated on the polyester supporting substrate, 20 percent transmissive chromium, in a thickness of 100 Angstroms. following layers in the order indicated: (1) a polyester supporting substrate, (2) a chromium conductive layer, (3) a photogenerating layer containing trigonal selenium dispersed in a poly(hydroxyether) resinous binder, and (4) a charge transport layer of the diamine of Example I dispersed in a polycarbonate.

EXAMPLE VI

A photoresponsive device was prepared by repeating the procedure of Example V with the exception that prior to overcoating the conductive chromium layer with the photogenerating layer, there was overcoated on the chromium, a dielectric layer of silicon dioide, in a thickness of 150 Angstroms by vacuum deposition of silicon in a low pressure of oxygen gas.

There thus results a photoresponsive device containing the following layers in the order indicated: (1) a polyester supporting substrate, (2) a chromium conductive layer, (3) a dielectric layer of silicon dioxide, and (4) a photogenerating layer containing trigonal selenium dispersed in a poly(hydroxyether) resinous binder, and (5) a charge transporting layer containing the diamine of Example I dispersed in a polycarbonate.

EXAMPLE VII

A photoresponsive device was prepared by repeating procedure of Example I with the exception that there was added 2.0 grams of a dispersion of trigonal selenium dispersed in the poly(hydroxyether) phenoxy resinous binder, a mixture, in a ratio of 2:1 by volume, of 2 milliliters of methylethyl ketone, and methylcellsolve acetate. The resulting diluted dispersion was then further treated in accordance with the procedure of Example I, and overoated on the aluminum conductive layer. As a result of the dilution in accordance with this Example, there results a photoresponsive device containing a photogenerating layer of a thickness of 0.4 microns.

There thus results a photoresponsive device containing in the order stated: (1) a polyester supporting substrate, (2) an aluminum conductive layer, (3) a photogenerating layer 0.4 micron in thickness, containing trigonal selenium dispersed in a poly(hydroxyether), and (4) a charge transporting layer, containing the diamine of Example I, dispersed in a polycarbonate.

EXAMPLE VIII

A photoresponsive device was prepared by repeating the procedure of Example VII with the exception that the dispersion of trigonal selenium and poly(hydroxyether) phenoxy resin, was further diluted with 4 milliliters of a solvent mixture of methylethyl ketone and methylcellulose acetate, ration 2:1 by volume. There thus results a photoresponsive device containing a photogenerating layer in a thickness of 0.3 micron.

The photoresponsive device prepared in accordance with Example VIII contains the following layers in the order indicated: (1) a polyester supporting substrate, (2) an aluminum conductive layer, (3) a photogenerating layer of trigonal selenium contained in the poly(hydroxyether) phenoxy resinous binder, 0.3 microns in thickness, and (4) a charge transporting layer containing the diamine of Example I, dispersed in a polycarbonate.

EXAMPLE IX

A photoresponsive device was prepared by repeating procedure of Example I with the exception that subsequent to preparation of the dispersion of trigonal selenium and poly(hydroxyether), there was added to 2 grams of this dispersion, 2.0 grams of a solution of poly(hydroxyether), Bakelite phenoxy PKHH, commercially available from Union Carbide Corporation, 10 percent by weight, dispersed in methylethyl ketone and methylcellosolve acetate, weight ratio of 3:1. The resulting diluted dispersion was then added to a solution of tetrahydrofuran and further treated in accordance with the procedure of Example I prior to being coated on the aluminum substrate. As a result of this dilution, the photogenerating layer contained about 15 percent by volume of trigonal selenium dispersed in 85 percent by volume of the poly(hydroxyether) phenoxy resin.

There thus results a photoresponsive device containing in the order stated: (1) a polyester supporting substrate, (2) an aluminum conductive layer, (3) a photogenerating layer of trigonal selenium dispersed in a poly(hydroxyether), 0.6 microns in thickness, containing 15 percent by volume of trigonal selenium and (4) a charge transporting layer, containing the diamine of Example I, dispersed in a polycarbonate resinous binder.

Example X

There was prepared a photoresponsive device by adding to a 4 ounce amber glass bottle, 17.0 milliliters of methylethyl ketone, 7.7 milliliters of methylcellosolve acetate, 3.3 grams of sodium hydroxide backwashed or rinsed, with trigonal selenium, 1.6 grams of the poly(hydroxyether) Bakelite phenoxy PKHH, commerically available from Union Carbide Corporation, and 200 grams of ⅛ inch diameter, 316 stainless steel shot. The resulting mixture was then mixed on a roller mill for 96 hours resulting in a dispersion of sodium doped trigonal selenium, 33 volume percent, particle size 0.05 microns to 0.20 microns, in 67 volume percent of poly(hydroxyether).

Of the above prepared dispersion, 1.5 grams was then added to 2.5 grams of a solution of tetrahydrofuran, containing 0.025 grams of the diamine N,N'-diphenyl-N,N'-bis(3-methylphenyl)1,1'-biphenyl-4,4'-diamine. This mixture was then coated on a 20 percent transmissive, aluminized polyester, (polyester substrate 75 microns in thickness, containing an aluminum overcoating 100 Angstrom in thickness), with a 0.005 inch Bird applicator, and dried at 135° C. for 5 minutes, resulting in the formation of a photogenerating layer of about 0.6 microns in thickness, containing 28 volume percent of triganol selenium dispersed in 72 volume percent of the poly(hydroxyether) resinous binder.

Subsequently, there was overcoated on the above photogenerating layer by solvent dispersion a charge transporting layer, 25 microns in thickness, containing 50 percent by weight of N,N'-diphenyl-N,N'-bis(3-methylphenyl)1,1'-biphenyl-4,4'-diamine, 50 percent by weight, dispersed in 50 percent by weight of a polycarbonate commercially available as Makralon.

There results a photoresponsive device containing in the order stated: (1) a polyester supporting substrate, (2) an aluminum conductive layer, (3) a photogenerating layer 0.6 microns in thickness, containing trigonal selenium doped with sodium, dispersed in a poly(hydroxyether) phenoy resinous binder, and (4) a charge transporting layer, containing the diamine of Example I, dispersed in a polycarbonate resin.

EXAMPLE XI

There was prepared a photoresponsive device by adding to a 4 ounce amber glass bottle, 17.0 milliliters of methylethyl ketone, 7.7 milliliters of methylcellosolve acetate, 3.3 grams of trigonal selenium washed with a sodium phosphate buffer, pH of 7, 1.6 grams of the poly(hydroxyether) Bakelite phenoxy PKHH, commercially available from Union Carbide Corporation, and 200 grams of ⅛ inch diameter, 316 stainless steel shot. The resulting mixture was then mixed on a roller mill for 96 hours resulting in a dispersion of sodium doped trigonal selenium, 33 volume percent, particle size 0.05 microns to 0.20 microns, dispersed in the poly(hydroxyether) resinous binder.

The above prepared dispersion, 1.5 grams was then added to 2.5 grams of a solution of tetrahydrofuran, containing 0.025 grams of the diamine N,N'-diphenyl-N,N'-bis(3-methylphenyl)1,1'-diamine. This mixutre was then coated on the transmissive, 20 percent, aluminized polyester of Example VIII, with a 0.005 inch Bird applicator, and dried at 135° C. for 5 minutes, resulting in the formation of a photogenerating layer on a conductive substrate.

Subsequently, there was overcoated on the above photogenerating layer by solvent dispersion a charge transporting layer, 25 microns in thickness, containing 50 percent by weight of N,N'-diphenyl-N,N'-bis(3-methylphenyl)1,1'-biphenyl-4,4'-diamine, 50 percent by weight, dispersed in 50 percent by weight of a polycarbonate commercially available as Makrolon.

EXAMPLE XII

A photoresponsive device was prepared by repeating the procedure of Example XI with the exception trigonal selenium was treated with a sodium phosphate buffer, pH=10, resulting in a sodium doped trigonal selenium dispersed in the poly(hydroxyether) phenoxy resin, as a photogenerating layer.

EXAMPLE XIII

A photoresponsive device was prepared by repeating the procedure of Example I with the exception that as the resinous binder there was selected instead of the Bakelite phenoxy PKHH, the poly(hydroxyether) resinous binder, Araldite ® 6097, commerically avaialbe from CIBA, a solid unmodified epoxy resin, and further toluene in an equal amount was substituted for the methylcellosolve acetate solvent.

There thus results a dispersion of trigonal selenium, 33 percent by volume in 67 percent by volume of the poly(hydroxyether) resinous binder Araldite ® 6097.

The resulting photoresponsive device contains the following layers in the order indicated: (1) a polyester supporting substrate, (2) a conductive aluminum layer, (3) a photogenerating layer, 0.6 microns in thickness containing trigonal selenium, dispersed in the poly(hydroxyether) resinous binder Araldite ® 6097, and (4) a charge transporting layer, containing the diamine of Example I dispersed in a polycarbonate.

EXAMPLE XIV

A photoresponsive device was prepared by repeating the procedure of Example XIII with the exception that there was deposited on the polyester supporting substrate, instead of aluminum, 20 percent transmissive chromium, 100 Angstrom units in thickness.

There results a photoresponsive device containing in the order stated: (1) a polyester supporting substrate, (2) a conductive layer of chromium, (3) a photogenerating layer, 0.6 microns in thickness, containing trigonal selenium, 33 percent by volume, dispersed in the poly(hydroxyether) resinous binder Araldite ® 6097, 67 percent by volume, and (4) a charge transporting layer, containing the diamine of Example I, dispersed in a polycarbonate resin.

EXAMPLE XV

A photoresponsive device was prepared by repeating the procedure of Example XIV with the exception that prior to coating the conductive chromium layer with the photogenerating layer, there deposited thereon a dielectric coating of silicon dioxide in a thickness of 150 Angstrom units, by vacuum deposition of silicon, in a low pressure of oxygen gas, by known techniques.

There results a photoresponsive device containing in the order stated: (1) a polyester supporting substrate, (2) a conductive layer of chromium, (3) a dielectric layer of silicon dioxide, (4) a photogenerating layer, 0.6 microns in thickness, containing trigonal selenium, dispersed in a poly(hydroxyether) resinous binder Araldite® 6097, 33 percent by volume, trigonal selenium and 67 percent by volume of resin and (5) a charge transporting layer, containing the diamine of Example I, dispersed in a polycarbonate resin.

EXAMPLE XVI

A photoresponsive device was prepared by repeating the procedure of Example XV with the exception that there was selected as the dielectric layer, instead of silicon dioxide, a dielectric layer of silicon nitride, Si:N in a thickness of 150 Angstroms.

EXAMPLE XVII

There was prepared as determined by IR spectroscopy, the phenyl carbonate derivative of a poly(hydroxyether) by the following method.

In an Erlemeyer flask with a two neck adapter, the poly(hydroxyether of bisphenol A (2,2-bis-(4-hydroxyphenyl-propane) 25 grams, (0.088 mole) and pyridine 15.8 grams (0.2 mole) was dissolved into 250 ml of dry 1,2 dimethyoxyethane. To this reaction mixture was added slowly, with stirring, 20.7 grams (0.13 mole) of phenylchloroformate in 150 ml of dry 1,2 dimethoxyethane. An exothermic reaction was observed, causing the temperature to increase to 55°–60 C. The mixture was reflux for 2 hours with stirring. The phenyl carbonated polymer in solution was slowly poured into 3,600 ml of methanol with a small amount of crushed ice and 1 percent of concentrated HCL (36 ml). The polymer precipitated in the form of flakes and was separated by filtration. The polymer was then dissolved in 1,000 ml of 1,2-dimethoxyethane (3.9 percent) and poured slowly in 8,000 ml of distilled water. The flaky precipitate was again filtered. The resulting polymer was then dissolved into 800 ml of dimethoxyethane and added dropwise to 5,600 ml of methanol followed by filtration of the precipate and drying in vacuum at 10–15 mm Hg at 50°–60° C. for 1 day.

About 0.8 grams of the above-prepared phenylcarbonate derivative, 7 milliliters of tetrahydrofuran, 7 milliliters of toluene, 0.38 grams of sodium hydroxide washed trigonal selenium powder and 100 grams of ⅛ inch diameter, stainless steel shot were added to a 4 ounce amber glass bottle. The mixture was then rolled on a roller mill for 96 hours, resulting in a sodium doped trigonal selenium dispersion, particle sizes of 0.05 microns to 0.20 microns, 33 volume percent of trigonal selenium.

Subsequently, the dispersion was then coated on 20 percent transmissive aluminized Mylar, (aluminum 100 Angstroms in thickness coated on a Mylar substrate 75 microns in thickness), with a 0.005 inch Bird coater, and followed by drying at 135° C. for 5 minutes, resulting in the formation of a photogenerating layer, 0.6 microns in thickness on a conductive substrate.

Subsequently, there was coated on the above photogenerating layer by solvent dipsersion, a charge transporting layer, 25 microns in thickness, containing 50 percent by weight of N,N'-diphenyl-N,N'-bis(3-methylphenyl)1,1'-biphenyl-4,4'diamine dispersed in 50 percent by weight of a polycarbonate avaliable as Makrolon from Bayer Corporation.

There results a photoresponsive device containing in the order stated: (1) a polyester supporting substrate, (2) a conductive layer of aluminum, (3) a photogenerating layer, 0.6 microns in thickness, containing sodium doped trigonal selenium, dispersed in a poly(hydroxyether) phenoxy resinous binder and (4) a charge transporting layer, containing the diamine indicated, dispersed in a polycarbonate resin.

EXAMPLE XVIII

A photoresponsive device was prepared by repeating the procedure of Example XVII with the exception that the trigonal selenium was not treated with the sodium hydroxide, thus resulting in a photogenerating layer containing trigonal selenium (undoped), 33 percent by volume, dispersed in 67 percent by volume of the poly(-hydroxyether) resinous binder containing the phenyl carbonated polymer.

EXAMPLE XIX

Each of the photoresponsive devices prepared in accordance with Examples I–XVIII was tested for photosensitivity by the following method.

The conducting layer, for example the aluminum layer of Example I of each photoresponsive device, was shorted to a ground potential. The photoresponsive devices were then charged in the dark to about 1,000 volts, with a pin corotron. The surface potential of each of the photoresponsive devices was continuously monitored in order to determine the decay of the surface potential in the dark. The photoresponsive devices were then recharged to about 1,000 volts.

After 0.156 seconds, the photoresponsive devices were exposed to 5 ergs/cm$^2$ of broad band white light. The surface potential was measured on an electrometer, and recorded in a computer, 0.5 seconds after each exposure.

The ratio of the surface potential after exposure of each of the photoresponsive devices to light, to the surface potential of each of the photoresponsive devices in the dark is a measure of the photoconductivity of each device. The percent discharge is calculated as being 1 minus this ratio multiplied by 100. Thus, forexample, if the potential of the photoresponsive device in the dark was 900 volts, and the potential after exposure to light was 108 volts, the percent discharge is 88 percent (0.88×100), reference Example I.

The percent discharge for the photoresponsive devices indicated was as follows:

| Example | % Discharge |
| --- | --- |
| 1 | 88 |
| 2 | 97 |
| 3 | 89 |
| 4 | 94 |
| 5 | 93 |
| 6 | 95 |
| 7 | 85 |
| 8 | 84 |

-continued

| Example | % Discharge |
|---|---|
| 9 | 84 |
| 10 | 78 |
| 11 | 97 |
| 12 | 95 |
| 13 | 77 |
| 14 | 83 |
| 15 | 85 |
| 16 | 92 |
| 17 | 72 |
| 18 | 80 |

In the above tabulation, the percent discharge represents the amount of charge lost as a result of the light exposure. Thus, for the photoresponsive device of Example I, 88 percent of the charge was lost, indicating this device has photoconductivity, and thus could be used to form electrostatic latent images.

Although the invention has been described with reference to specific preferred embodiments, it is not intended to be limited thereto, rather those skilled in the art will recognize that variations and modifications may be made therein which are within the spirit of the invention and within the scope of the claims.

We claim:

1. An improved layered photoresponsive imaging device comprised in the order stated of (1) an optional supporting substrate, (2) a conductive layer, (3) a photogenerating layer comprised of an inorganic photoconductive composition, or an organic photoconductive composition, dispersed in a resinous binder material comprised of a poly(hydroxyether) material selected from the group consisting of those of the following formulas:

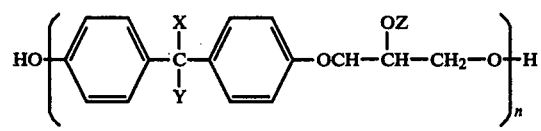

and

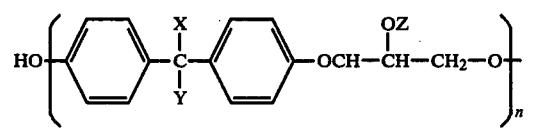

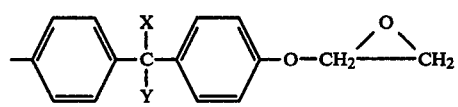

wherein X and Y are independently selected from the group consisting of aliphatic groups and aromatic groups, Z is hydrogen, an aliphatic group, or an aromatic group, and n is a number of from about 50 to about 200, and (4) in contact with the photogenerating layer a charge transport layer comprised of an electrically active composition dispersed in an insulating organic resinous binder, which composition is of the following formula:

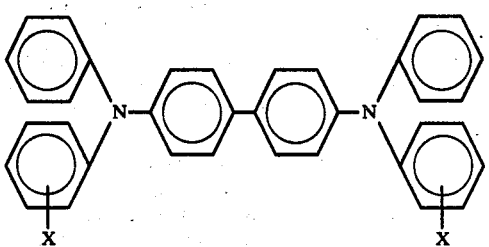

wherein X is selected from the group consisting of ortho (CH$_3$), meta (CH$_3$), para (CH$_3$), ortho (CL), meta (CL) and para (CL).

2. An improved photoresponsive device in accordance with claim 1 wherein the substrate is insulating, and is comprised of a polymeric composition.

3. An improved photoresponsive device in accordance with claim 1 wherein the conductive layer is comprised of aluminum, chromium, nickel, gold, titanium, stainless steel, or graphite.

4. An improved photoresponsive device in accordance with claim 1 wherein the conductive composition is overcoated with a thin dielectric layer.

5. An improved photoresponsive device in accordance with claim 1 wherein the inorganic photoconductive composition is selected from amorphous selenium, amorphous selenium alloys, doped amorphous selenium substances, doped amorphous selenium alloys, or trigonal selenium.

6. An improved photoresponsive device in accordance with claim 5 wherein the selenium alloys are comprised of selenium tellurium, selenium arsenic, and selenium-tellurium-arsenic.

7. An improved photoresponsive device in accordance with claim 6 wherein the selenium arsenic alloy contains 99.5 percent selenium and 0.5 percent arsenic.

8. An improved photoresponsive device in accordance with claim 5 wherein the dopant is chlorine, bromine, iodine, or sodium.

9. An improved photoresponsive device in accordance with claim 8 wherein the dopant is present in an amount of from about 50 parts per million to about 5,000 parts per million.

10. An improved photoresponsive device in accordance with claim 1 wherein the organic photoconductive composition is a metal free phthalocyanine, a metal phthalocyanine, a charge transfer complex material, or a squarilium dye.

11. An improved photoresponsive device in accordance with claim 1 wherein the organic photoconductive composition is vanadyl phthalocyanine.

12. An improved photoresponsive device in accordance with claim 1 wherein X and Y are methyl, Z is hydrogen, and n ranges from about 100 to about 125.

13. An improved photoresponsive device in accordance with claim 1 wherein Z is a phenyl carbonate group.

14. An improved photoresponsive device in accordance with claim 1 wherein the poly(hydroxyether) is prepared from a diphenol and epichlorohydrin.

15. An improved photoresponsive device in accordance with claim 14 wherein the diphenol is bis phenol A, dichloro bis phenol A, tetrachloro bis phenol A, tetrabromo bis phenol A, bis phenol F, bis phenol L, bis phenol B, or bis phenol S.

16. An improved photoresponsive device in accordance with claim 1 wherein from about 15 percent by volume to about 35 percent by volume of the inorganic photoconductive composition or the organic photoconductive composition are dispersed in from about 65 percent by volume to about 85 percent by volume of the poly(hydroxyether) resinous binder.

17. An improved photoresponsive device in accordance with claim 16 wherein about 25 percent by volume of the inorganic photoconductive composition or the organic photoconductive composition are dispersed in 75 percent by volume of the poly(hydroxyether) resinous binder material.

18. An improved photoresponsive device in accordance with claim 1 wherein the charge transport layer is comprised of N,N'-diphenyl-N,N'-bis(3-methylphenyl)-[1,1'-biphenyl]4,4'-diamine dispersed in a polycarbonate resin.

19. An improved photoresponsive device in accordance with claim 1 wherein the charge transport layer is comprised of N,N'-diphenyl-N,N'-bis(3-methylphenyl)-[1,1'-biphenyl]-4,4'-diamine dispersed in a poly(hydroxyether) resinous binder material.

20. An improved photoresponsive device in accordance with claim 1 wherein from about 10 percent to about 75 percent by weight of the diamine are dispersed in from about 25 percent by weight to about 90 percent by weight of the resinous binder material.

21. An improved photoresponsive device in accordance with claim 20 wherein resinous binder material is a polycarbonate resin or a poly(hydroxyether).

22. An improved photoresponsive device in accordance with claim 1 wherein thickness of the substrate ranges from about 50 microns to about 200 microns, the thickness of the conductive layer ranges from about 50 Angstrom units to 200 Angstrom units, the thickness of the generating layer ranges from about 0.1 micron to about 5 microns, and the thickness of the transport layer ranges from about 10 microns to about 50 microns.

23. An improved photoresponsive device in accordance with claim 22 wherein the thickness of the substrate is about 75 microns, the thickness of the conductive layer is about 100 Angstrom units, the thickness of the generating layer is 0.5 microns, and the thickness of the transport layer is about 25 microns.

24. An improved photoresponsive device in accordance with claim 23 wherein the supporting substrate is a polymeric insulating material, the conductive composition is aluminum, the photogenerating layer is comprised of trigonal selenium dispersed in a poly(hydroxyether) resinous binder composition, and the transport layer is comprised of a diamine dispersed in a polycarbonate resin.

25. A method of imaging which comprises forming a latent electrostatic image on the layered photoresponsive imaging device of claim 1, developing this image with a toner composition containing resin particles and pigment particles, transferring the developed image to a suitable substrate, and optionally permanently affixing the image thereon by heat.

26. A method of imaging in accordance with claim 25, wherein the inorganic photoconductive composition is selected from amorphous selenium, amorphous selenium alloys, doped amorphous selenium substances, doped amorphous selenium alloys, or trigonal selenium, and the organic photoconductive composition is a metal free phthalocyanine, a metal phthalocyanine, vanadyl phthalocyanine, or a squarillium dye.

* * * * *